Patented Oct. 27, 1931

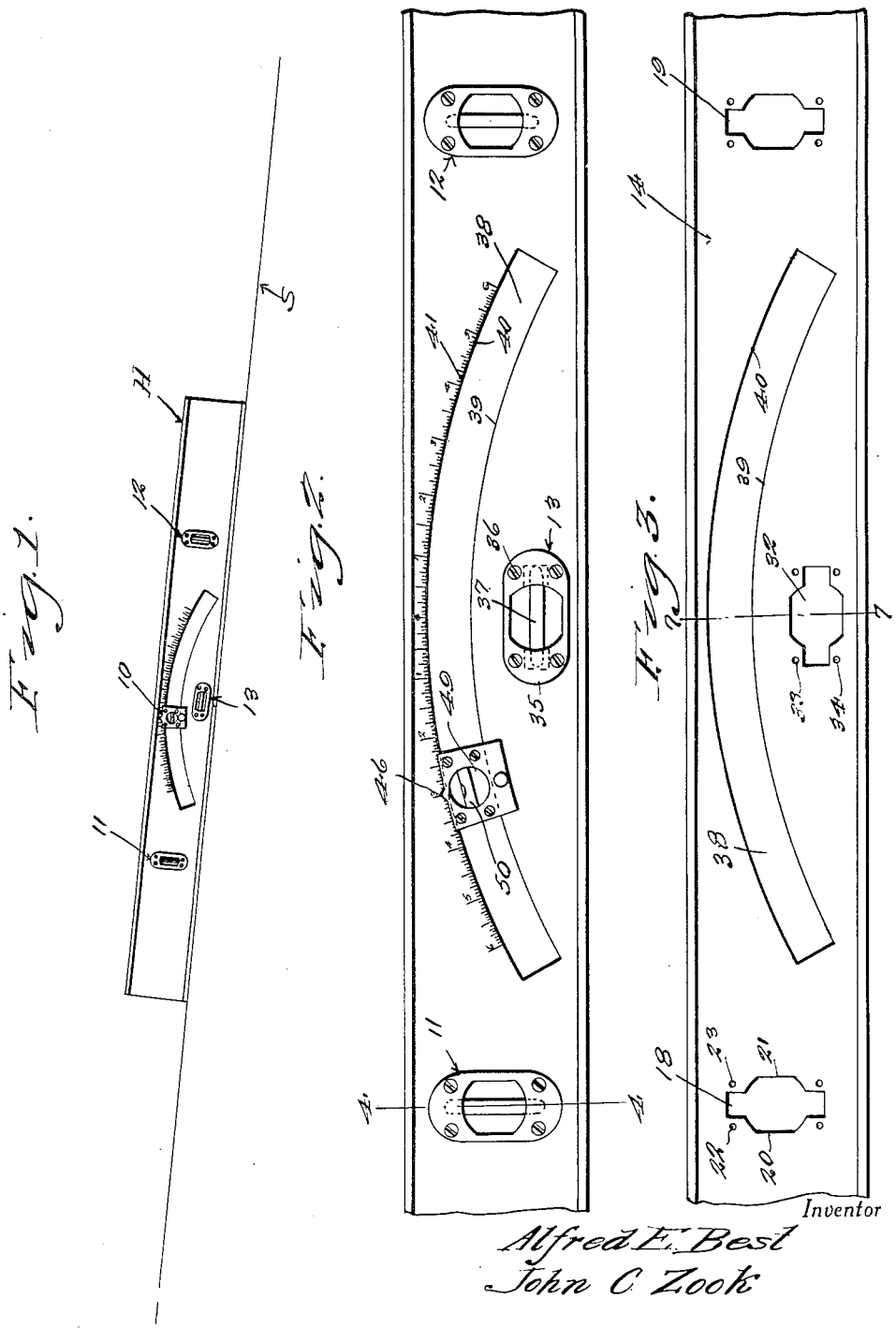

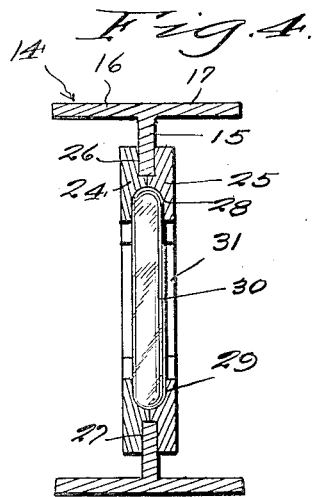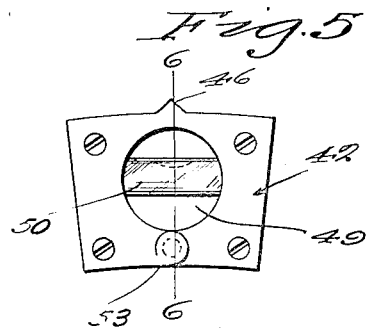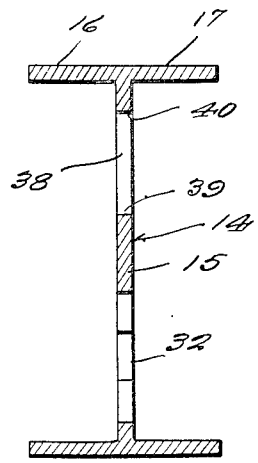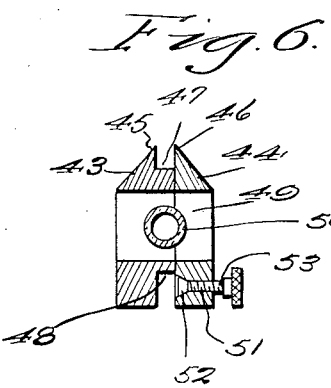

1,829,257

UNITED STATES PATENT OFFICE

ALFRED EDGNA BEST AND JOHN CHRISTIAN ZOOK, OF CONSHOHOCKEN, PENNSYLVANIA, ASSIGNORS OF ONE-HALF TO JOHN KEARNS AND E. ARNOLD FORREST, BOTH OF CONSHOHOCKEN, PENNSYLVANIA

COMBINED LEVEL AND INCLINOMETER

Application filed February 28, 1929. Serial No. 343,314.

This invention relates to combined level and inclinometers and is more particularly adapted to the requirements of skilled tradesmen, such as bricklayers, carpenters, machinists, and millwrights.

One of the objects of the invention is to provide an instrument of the character described which is adapted to be used as a plumb line, a level and an inclinometer, whereby the necessity of the mechanic carrying three different instruments is obviated.

Another object of the invention is to provide on a plumb or level, an inclinometer which is capable of measuring very accurately, inclines up to six inches per foot, while at the same time, indicating the incline per foot accurately down to as small an incline as one thirty-second of an inch.

Another object of the invention is to provide a combined level and inclinometer which may be viewed from both sides of the instrument, thereby promoting ease of manipulation and speed in the use thereof.

Further objects of the invention are to provide an instrument of the character described which is strong, durable and compact, highly efficient for its intended purpose and thoroughly reliable in its operation, having frangible parts thereof demountable so as to be capable of easy repair, very simple in its method of assembly, and comparatively inexpensive to manufacture and requiring the minimum of storage space in the mechanic's tool chest.

With the foregoing and other objects in view, the invention consists of the novel construction, combination, and arrangement of parts as will be hereinafter more specifically described and illustrated in the accompanying drawings, wherein is illustrated an embodiment of the invention, but it is to be understood that changes, variations, and modifications, may be resorted to, without departing from the spirit of the claims hereunto appended.

In the drawings, wherein like reference characters designate corresponding parts throughout the several views:

Figure 1 is a side elevation of the device in accordance with this invention, illustrating an adaptation thereof with a surface disposed at an angle of inclination.

Figure 2 is a fragmentary enlarged side elevational view of the device.

Figure 3 is a side elevation of the device, showing the blank without the demountable parts attached thereto.

Figure 4 is a vertical sectional view taken on the line 4—4 of Figure 2.

Figure 5 is a side elevation of the shuttle member detached from the body portion of the device.

Figure 6 is a detailed vertical section taken on the line 6—6 of Figure 5.

Figure 7 is a vertical sectional view, taken on the line 7—7 of Figure 3.

Referring to the drawings in detail, wherein is disclosed an embodiment of the invention, and particularly to Figure 1 thereof, H indicates the instrument in accordance with this invention, resting upright on its lower edge upon an inclined surface, indicated generally at S whereupon the treble function of the device is clearly disclosed. The surface S may illustrate a roof, a rafter, or any other fixed or movable surface. To illustrate one adaptation of the instrument, the surface S may be a fixed incline, such as a roof, rafter or the like, whereupon the inclinometer may be used to give the incline per foot in very accurate measurements down to one thirty-second of an inch. If the surface S is a rafter to be trued in a vertical plane, then the pair of vertically disposed bubble tubes indicated generally at 11 and 12 may be used. If the surface S be movable in a horizontal plane and it is desired to true the same to an exact horizontal plane parallel with the lower edge of the instrument H, then the centrally disposed level member 13 is utilized for this purpose.

From the foregoing, it will be apparent that the treble function of the instrument in accordance with this invention presents one of treble utility requiring but one instrument which is within easy reach of the mechanic for all purposes requiring vertical or horizontal parallelism or where it is necessary to determine an angle of inclination with respect to true horizontal or vertical planes.

Having once trued a surface with respect to a horizontal or vertical plane, the same instrument within easy reach of the mechanic has utility in measuring inclination, with respect to the true horizontal or vertical plane.

The instrument, in accordance with this invention comprises a body portion; substantially I-shaped in cross section indicated at 14, having a web 15, formed between oppositely disposed horizontal legs 16, 17, formed on the upper and lower edges of the body portion 14. The web is of greater width than the combined width of the oppositely disposed legs 16, 17.

The width of the legs 16 and 17 on the upper and lower edges of the body portion should be such as to form a stable support when the instrument is resting on a plane surface. The upper and lower edges of the body portion are in true parallel relation with each other and disposed in planes perpendicular to the web portion 15 thereof. The body portion may be formed of nickel steel or other rust resistant rigid metal, adapted for the purpose.

Adjacent the outer end of the body portion, the said body portion is provided with a pair of substantially rectangular openings 18, and 19, outset on their side edges intermediate the ends thereof as at 20 and 21. The pair of openings 18 and 19 have their longitudinal planes disposed transversely across the body portion 14 and are formed in the web 15 thereof. Adjacent each end of the openings 18 and 19 are openings 22 and 23, to provide anchorage for the frame presently to be described.

Inasmuch as each of the demountable frames for disposal in the openings 18 and 19 are the same, it is believed that a description of one will suffice for both. A demountable frame is formed of two sections 24, and 25, which overlap, abut against the web 15 adjacent the openings 18 and 19, as indicated at 26 and 27 and is secured to the body portion and to each other by screws engaging both sections 24 and 25 of the frame and extending through the openings 22 and 23.

The abutting faces of the frame are provided with a cavity 28—29 in which is vertically supported the spirit tube 30 having the usual bubble confined within the walls of the tube. Adjacent the upper and lower edges of the frame, each section 24 and 25 is provided with openings which register with each other to form a single opening 31, which communicates in registration with the openings 18 and 19. The spirit tube 30 is spaced with respect to the sides of the frame and may be viewed from either side of the body portion of the instrument. At the center, the body portion is provided with an opening 32, in the web 15 thereof, which is similar in all respects to the openings 18 and 19, with the exception that the longitudinal dimension of the opening is disposed longitudinally of the body portion.

The opening 32 is located at a point below the longitudinal median of the web and the said body portion and is provided with smaller circular openings 33 and 34 similar to the openings 22 and 23. A demountable sectional frame indicated at 35 is formed and secured by screws or other hold fast devices 36 in all respects similar to the vertically disposed frames at the ends of the body portion. The spirit tube 37 is similar in all respects to the vertical spirit tubes 30 with the exception that the spirit tube 37 is disposed in spaced parallelism with the upper and lower edges of the body portion.

An arcuate slot 38 is laid out in the web of the body portion and is disposed between the vertically disposed indicator members 11, 12, and partially circumscribes the horizontal indicator member 13. The lower edge 39 and the upper edge 40 of the slot 38 are in spaced parallelism. The face of the web adjacent the upper edge 40 of the slot is provided with scale markings calibrated directly in inches with respect to the inclination of the lower edges of the body portion. The scale markings are indicated at 41 and by reason of the radius of the slot 38, which is twelve inches, it is possible to be divided into readable and accurate markings equivalent to one-thirty-second of an inch per foot of incline.

A demountable shuttle member indicated generally at 42 is detachably mounted in adjustable position in the slot 38 in the following manner. The body portion of the shuttle is formed of two sections 43 and 44 disposed on opposite sides of the web 15. The shuttle member tapers off at the top thereof in pointers 45 and 46, which register with the scale markings 41 on the opposite faces of the web adjacent the upper edge 40 of the slot 38. The sections are adapted to abut each other in the space of the slot 38, while the upper edge 40 of the slot 38 rides in an arcuate channel 47 and the lower edge 39 rides in an arcuate channel 48 formed at the upper and lower edges of the body portion of the shuttle and along the longitudinal median thereof. The sections 43 and 44 are secured together by a plurality of hold fast devices, which threadably engage both sections at points interiorly of the slot in which the shuttle rides. Both sections of the shuttle are formed with a transverse continuous circular opening 49, which are of less diameter than the width of the slot 38. These openings register with each other and form a single opening when sections 43, 44 are secured together.

The opening 49 is confined within the slot 38 and has a spirit tube 50, extending across the opening, the opposite ends of which are secured in the walls of the shuttle member.

One section of the shuttle 44 adjacent the lower edge thereof is formed with a threaded opening 51 which extends from the outer face of the said section and extends into the lower slot 48. The opening 51 adjacent the outer end thereof is threaded and the inner portion thereof is provided with bevelled walls 52, for supporting the set screw 53, which has a bevelled head on its inner end which seats in the bevelled walls of the opening 52. By turning the set screw 53, the bevelled head thereof abuts the web adjacent the lower edge of the slot 38 and detachably secures the shuttle in any desired position along the slot 38. This screw 51 has its head detachably connected therewith in any suitable manner such for instance by making the outer end of the screw of reduced size and by providing it with left hand threads on said reduced end, this reduced part fitting in a threaded socket in the head. This permits the insertion of the screw in the hole in the saddle when the two parts of the saddle are separated.

It is pointed out that the frame of the vertical indicators 11 and 12 and the frame of the horizontal indicator 13, together with the shuttle frame 42, are all demountable and sectional, so that the frangible bubble tubes supported therein may be replaced in case of breakage.

To measure the inclination of a surface with the instrument, the lower edge of the body portion is disposed on surface S as shown in Fig. 1 of the drawings. With pointers 45, 46 set at zero of the markings 41, the bubble in the tube 50 would move to the left, if the instrument was disposed as in Fig. 1. This would necessitate the movement of shuttle 42 to the left until the bubble comes back to the center lines of the tube. With the bubble in the center of the tube, the pointers 45, 46 will indicate on the markings 41, the rise in inches per foot of incline of the surface being measured, the markings having been previously calibrated to the slot 38 which is on a twelve inch radius.

What is claimed as new is:

1. In a device of the class described, an elongated body portion I-shaped in cross section and having the longitudinal side edges parallel to each other, means adjacent the ends of the body portion for indicating vertical parallelism of surfaces with respect to the longitudinal side edges, a single means in the body portion equidistant from the ends and adjacent one of the longitudinal sides thereof for indicating horizontal parallelism of surfaces with respect to the longitudinal side edges of the body portion, said body portion being provided with an arcuate slot intermediate the ends and the longitudinal side edges thereof, a shuttle member slidably mounted in the slot, means on the shuttle member for detachably fixing said shuttle at any desired point on the slot, said body portion being provided with markings adjacent the said slot, and means on said shuttle and cooperating with said markings to indicate the inclination of said body portion.

2. In a device of the class described, an elongated body portion I-shaped in cross section and having the longitudinal side edges parallel to each other, means adjacent the ends of the body portion for indicating vertical parallelism of surfaces with respect to the longitudinal side edges, a single means in the body portion equidistant from the ends and adjacent one of the longitudinal sides thereof for indicating horizontal parallelism of surfaces with respect to the longitudinal side edges of the body portion, said body portion being provided with an arcuate slot intermediate the ends and the longitudinal side edges thereof, a shuttle member slidably mounted in the slot, means on the shuttle member for detachably fixing said shuttle at any desired point on the slot, said body portion being provided with markings adjacent the said slot, and means on said shuttle and cooperating with said markings to indicate the inclination of said body portion, and said arcuate slot being formed with a twelve inch radius.

3. In a device of the class described, an elongated body portion I-shaped in cross section and having the longitudinal side edges parallel to each other, means adjacent the ends of the body portion for indicating vertical parallelism of surfaces with respect to the longitudinal side edges, a single means in the body portion equidistant from the ends and adjacent one of the longitudinal sides thereof for indicating horizontal parallelism of surfaces with respect to the longitudinal side edges of the body portion, said body portion being provided with an arcuate slot intermediate the ends and the longitudinal side edges thereof, a shuttle member slidably mounted in the slot, means on the shuttle member for detachably fixing said shuttle at any desired point on the slot, said body portion being provided with markings adjacent the said slot, and means on said shuttle and cooperating with said markings to indicate the inclination of said body portion, and said last mentioned means including a bubble tube and a pointer.

4. In a device of the class described, an elongated body portion I-shaped in cross section and having the longitudinal side edges parallel to each other, means adjacent the ends of the body portion for indicating vertical parallelism of surfaces with respect to the longitudinal side edges, a single means in the body portion equidistant from the ends and adjacent one of the longitudinal sides thereof for indicating horizontal parallelism of surfaces with respect to the longitudinal side edges of the body portion, said body portion being provided with an arcuate slot intermediate the ends and the longitudinal side edges thereof, a shuttle member slidably mounted in the slot, means on the shuttle member for detachably fixing said shuttle at any desired point on the slot, said body portion being provided with markings adjacent the said slot, and means on said shuttle and cooperating with said markings to indicate the inclination of said body portion, said arcuate slot being formed with a twelve inch radius, and said last-mentioned means including a bubble tube and a pointer.

In testimony whereof we affix our signatures.

ALFRED EDGNA BEST.
JOHN CHRISTIAN ZOOK.